United States Patent

Costa et al.

[11] Patent Number: 6,138,121
[45] Date of Patent: Oct. 24, 2000

[54] NETWORK MANAGEMENT EVENT STORAGE AND MANIPULATION USING RELATIONAL DATABASE TECHNOLOGY IN A DATA WAREHOUSE

[75] Inventors: Brian Costa, Denver; Chris P. Das; William C. Kepner, both of Fort Collins, all of Colo.

[73] Assignee: Hewlett-Packard Company, Palo Alto, Calif.

[21] Appl. No.: 09/087,203

[22] Filed: May 29, 1998

[51] Int. Cl.[7] .................................................. G06F 17/30
[52] U.S. Cl. ........................ 707/100; 707/10; 707/104; 707/500; 707/513; 709/201
[58] Field of Search ................................. 707/104, 100, 707/10, 500, 513; 709/201

[56] References Cited

U.S. PATENT DOCUMENTS 5,832,504  8/1999  Tripathi et al. ...................... 707/104
5,934,909  8/1999  Ho et al. ............................... 434/362

Primary Examiner—John Breene
Assistant Examiner—Cheryl Lewis

[57] ABSTRACT

A data schema and method for storing network management system event data to allow efficient retrieval of information and aggregation for use in tracking system trends and generating useful reports is presented. The invention provides a standardized system event format that is generically available to the user through standard interfaces, along with a method for populating it. The data is easily accessible via standard interfaces to statistical process control, trend tracking, and report generating applications, which present information of interest relating to the events in a useful manner to thereby increase its value.

20 Claims, 3 Drawing Sheets

NETWORK MANAGEMENT EVENT STORAGE AND MANIPULATION USING RELATIONAL DATABASE TECHNOLOGY IN A DATA WAREHOUSE

FIELD OF THE INVENTION

The present invention pertains generally to network management and more particularly, to a data scheme and method for storing network management system event data to allow efficient retrieval of information and aggregation for use in tracking trends and generating useful reports.

BACKGROUND OF THE INVENTION

Prior art network management systems collected network system event information in an ASCII text file, typically in a serial data stream format.

Network system managers often require statistics and reports based on collected system events to alert them to system trends in order to proactively maintain normal system usage. Generally, this information is derived from the serial ASCII text event file by external statistical process control (SPC) and trend tracking applications, collectively referred herein as report generating applications, that gather, manipulate and format information from the event file to generate user-readable reports. However, in the past, each report generating application had to know the system-specific format of the contents of the event file in order to derive the required information to generate reports. Accordingly, a report generating application had to know the system specific format of event data stored in the event file, either by separately compiling the application with the system specific event file format or by feeding it event format information at setup time or runtime. Thus, in order to utilize such an application, the application developer had to provide some means of supporting the event file format. Accordingly, a need exists in the industry for a formal standardized data schema, a method for populating it, and a way to easily extract information from which various reports are generated.

In addition, due to breadth of different categories of system events, not all system events included the same amount of information. In some prior art implementations, this problem has been dealt with by allocating a standard size system event packet for any type system event, and allowing the field definitions to vary within the packet for each event type to accommodate the differing reporting information for different type system events. While this technique provides some leeway in the type of information reported in differing types of system events, it requires the standard size of a system event packet to be large enough to store a system event of the type having system event information of greatest length, and hence results in significant memory inefficiency due to allocated but unused bytes in event packets for those system events that do not require the full size of the standard size system event packet. Accordingly, a need exists for a method and data schema for storing system events dynamically according to the amount of required storage space.

One method for overcoming this problem is by defining a standard size system event packet that includes only those fields that are common to all events, and linking it to a variable binding packet that may vary in size according to the system event type. This technique allows the number and definitions of event fields to vary between different system event types, and ensures maximum memory efficiency. However, data required to generate useful reports about the system events is nonetheless difficult to extract. Report generating applications organize event information according to one or a few categories at a time, and then summarize information around those categories in a manner useful to the system administrator. In generating a report, the application typically utilizes in only a small subset of all of the detailed system event data for each event. In the prior art event storage techniques described above, however, the extraction of the relevant subset of fields from the complete detailed set of event fields requires a separate query on the database for each required event field for each event. When processing large amounts of event data and or when the application requires more than a small few event fields for each event, the high volume of queries on the database becomes a performance drain on the system. Accordingly, a need exists for a method for storing event data in a manner that allows relevant information for report generating applications to be easily extractable.

SUMMARY OF THE INVENTION

A data schema and method for storing network management system event data to allow efficient retrieval of information and aggregation for use in tracking system trends and generating useful reports is presented. The invention provides a standardized system event format that is generically available to the user through standard interfaces, along with a method for populating it. The data is easily accessible via standard interfaces to statistical process control, trend tracking, and report generating applications, which present information of interest relating to the events in a useful manner to thereby increase its value.

In accordance with the invention, an export manager receives system events that include a plurality of event fields. The export manager formats a first set of the event fields into a report-ready table, which includes all available event fields that are essential for generation of a particular report. The report-ready table is sent, via a standardized communications interface, to a data warehouse, where it is stored and made available via a standard communications interface for easy access (i.e., a single query) by report generating applications. The use of multiple tables in a relational database lends itself to structured query language (SQL) for data retrieval or report generation. An aggregation function summarizes collected data and maintains an event count of each event type that occurs on each node. A trim function removes unwanted data from the data warehouse after the data has been aggregated. A filter function is available to allow conditions to be specified on which event data is not stored in the data warehouse.

The data warehouse stores event data in a plurality of related tables each associated with a particular event or event type. The tables include report-ready event tables that contain a subset, relating to a particular type of reporting, of the available event fields for a given event. Report generating applications that perform that particular type of reporting may then access all necessary fields for a given event in a single query, thereby increasing the performance of the system.

BRIEF DESCRIPTION OF THE DRAWING

The invention will be better understood from a reading of the following detailed description taken in conjunction with the drawing in which like reference designators are used to designate like elements, and in which.

DETAILED DESCRIPTION

Figure 1:
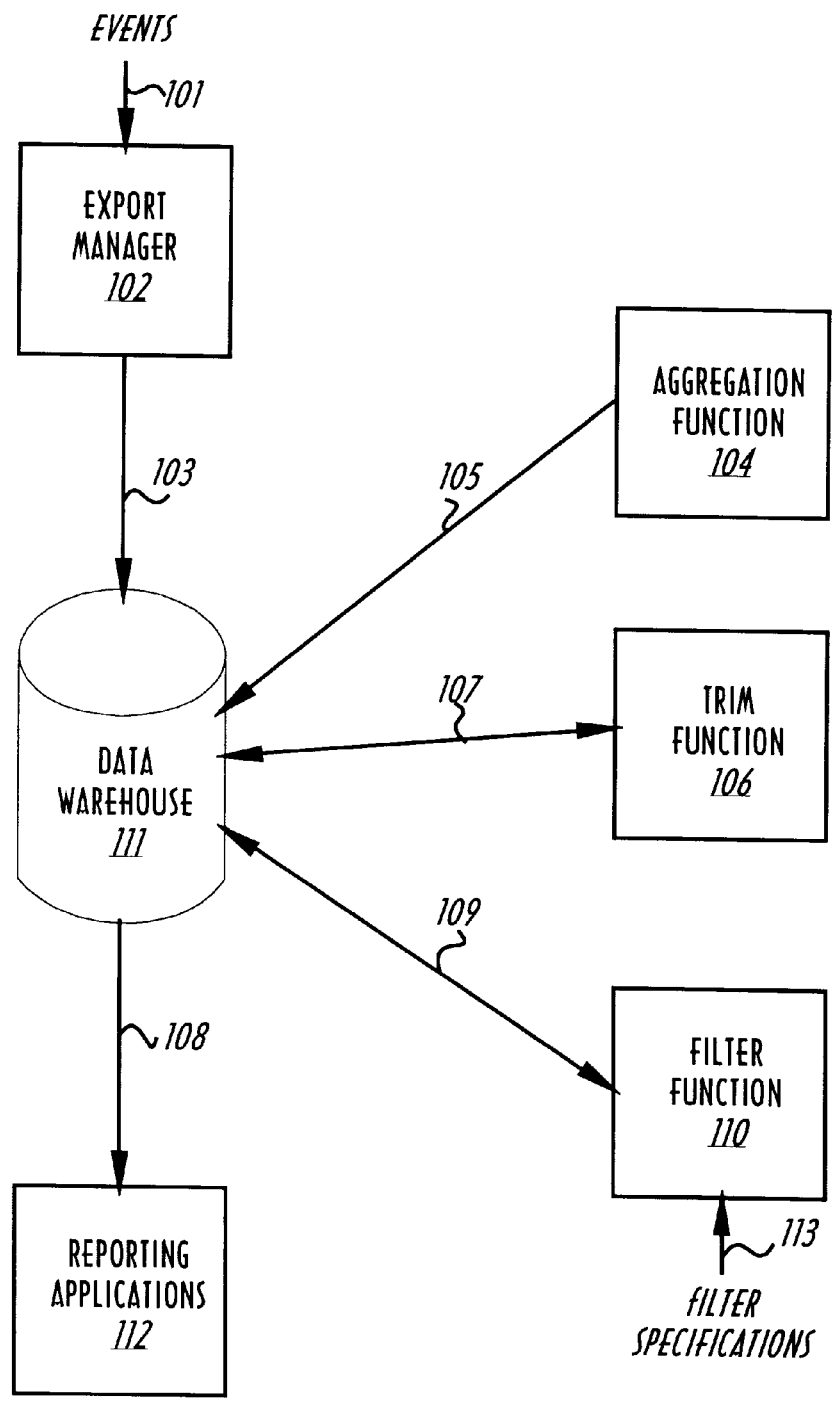
FIG. 1 is a block diagram of a system in accordance with the invention.

FIG. 1 is a block diagram of a system in accordance with the invention. Events 101 are collected by a network management system (not shown). Events 101 are generated by system hardware, the operating system, and applications running on the network. Events 101 typically alert the system administrator to various occurrences on the network, from which the status of the network can be derived. Typical system events fall into various categories, including events indicating that a network element has been added, removed, activated or failed, events indicating that a network element has reached a critical status, events indicating that a predefined threshold has been exceeded for a specific network resource, and events indicating that a potential authorization problem has occurred. Events 101 are typically generated by SNMP traps as alerts or warnings indicating abnormal situations within the network. Typically, the operating system of the network processes traps via an event director daemon which directs the events to various processing applications. Depending upon the type of events and their perceived severity, various reactive network management activities trigger a software process or alert the system administrator and eventually result in a solution to the problem.

An export manager 102 receives events 101. In one embodiment, export manager 102 is scheduled to retrieve events 101 from an event repository (not shown) into which the events 101 are deposited in realtime by the network management system (not shown). In an alternative embodiment, export manager 102 receives events 101 in realtime directly from the network management system as the events occur. Each event 101 is a series of raw data bytes that may vary in length depending on the event type. Appendix A illustrates an implementation of several events 101 in an example format received by export manager 102. Included for reference only, below each set of received raw data in Appendix A is an ASCII pseudo-interpretation of the raw data of its corresponding event. The pseudo-interpretation portion is what system administrators decipher in present day systems to determine the status of the network and pinpoint network problems and trends. Processing the pseudo-interpretation file to extract meaningful information is an art practiced only by skilled administrators.

Appendix A illustrates the raw data stream received for an example event. The pseudo-interpretation of this event is:

"Network Node Manager 250 Instant-On" software application license on machine "mercutio.cnd.hp.com", which supports 250 users, will expire on Tue Jul. 28, 1998 at 11:25:30. This event was generated at Fri May 29, 1998 at 11:27:49. This event has an object lid of "1.3.6.1.4.11.2.17.1.0.59179231".

Export manager 102 formats each event 101 into a formal data schema that allows different definitions for each event type. The formal data schema includes a set of tables that store the event fields of event 101 in a manner conducive to efficient retrieval of relevant information for various types of information reporting. Accordingly, depending on the anticipated type of reporting that will be performed, only those event fields that are essential to a particular type of reporting are stored in a corresponding table type. Each event may have multiple different tables associated with it, each differing from one another by storing at least one different event field. Accordingly, when an application requires information relating to a particular type of reporting, a single query is performed on the appropriate table associated with that type of reporting to obtain all of the essential information for an that event.

Figure 2:
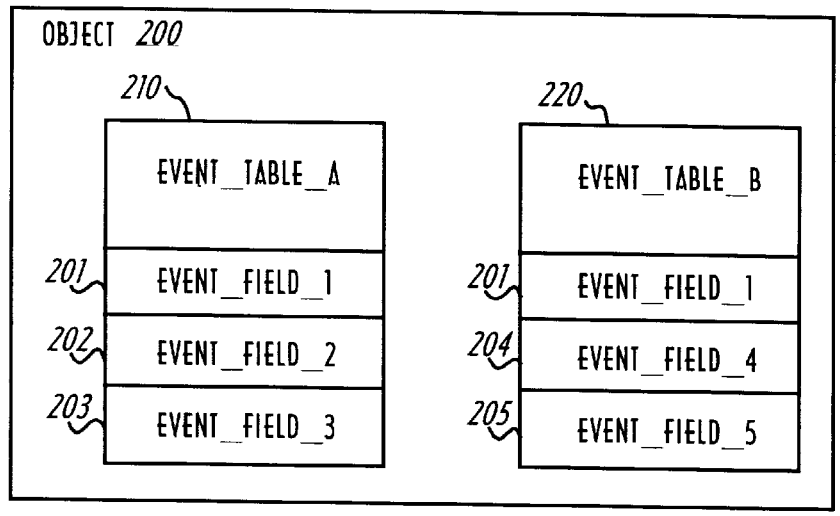
FIG. 2 is a diagram of an object in accordance with the formal data schema of the invention for one type of event.

Each table is defined to include all essential event fields required for its type of reporting. FIG. 2 illustrates an instance of an example object 200 in accordance with the formal data schema of the invention for one type of event having event fields 201, 202, 203, 204 and 205. Object 200 illustrates an instance of an object of only one type of event. However, as described previously, each event type may include any number of different report-ready tables. In this example, object 200 includes a first table event_table_A 210 formatted in view of a first type of reporting that includes event fields event_field_1 201, event_field_2 202 and event_field_3 203. Object 200 includes a second table event_table_B 220 formatted in view of a second type of reporting that includes event fields event_field_1 201, event_field_4 204 and event_field_5 205. In this example, if a first type of reporting is performed, a query is performed on event_table_A 210 to obtain all of event fields 201, 202 and 203 in a single communication. Similarly, if a second type of reporting is performed, a query is performed on event_table_B 220 to obtain all of event fields 201, 204 and 205 in a single communication. Thus, the need to perform a separate query on an event object for every event field essential to a particular type of reporting, or to retrieve unnecessary information essential to that type of reporting, is circumvented.

Referring back to FIG. 1, after formatting event 101 into its appropriate tables, export manager 102 sends the formatted event 103 to a data warehouse 111 using a standard communication interface. In the illustrative embodiment, formatted event data 103 is sent to data warehouse 111 using the well-known Microsoft's Open DataBase Connectivity (ODBC) Application Programming Interface (API). ODBC is a common interface for accessing different, or heterogeneous, Structured Query Language (SQL) databases that allows a single application to access different SQL Database Management Systems (SDMS) via a common set of code. This enables the application developer to build and distribute the application without targeting a specific DBMS. A database driver running on a target DBMS links the application to the user's DBMS.

Data warehouse 111 stores the formatted event data 103 in accordance with the formal data schema, discussed hereinafter, defined for the event type of event 101.

Event data stored in data warehouse 111 is accessible via a standard interface 108 (i.e., ODBC in the illustrative embodiment), which allows access to the data by reporting applications 112 running on systems based on a different DBMS.

Over time, as more and more data accumulates in data warehouse 111, in some situations the detailed information of each event becomes less important than information about the event. An aggregation function 104 provides a method for summarizing information about an event without retaining all the detail of the event. This function assists in maintaining a workable database capacity by allowing the detail of events to be purged from data warehouse 111 while retaining summary information about the purged events. The summary information allows applications to answer long-term questions (e.g., frequency of occurrence of a particular type of event on a specific node). For example, in the illustrative embodiment aggregation function 104 counts types of events for each network node and tallies the occurrences of these events over varying periods of time (e.g., daily, weekly, and monthly). Thus, one can look at the tallies and determine, for example, that a particular node had n number of a particular event type. The significance of this information depends on the event type. For example, if the event type is node_up, the tally may reveal that in a typical month a particular node experiences x node_up events, and that over the year that tally has increased continuously from x to x+y. This situation reveals a trend of increasing node_up events on that node, and could signal to the system administrator that a problem exists on that node. In other words, aggregation function 104 assists in summarizing events, retaining the history of the events, and allowing the detail of old events to be purged from data warehouse 111. Thus, aggregation function 104 provides some value to the administrator by reflecting a profile of network activity over time.

Trim function 106 purges or partially purges detailed events from data warehouse 111. Trim function 106 is preferably performed after the detailed events are summarized by aggregation function 104.

Network management systems often generate events that merely signal a normal occurrence on the system. An abundance of these types of events are often viewed as a nuisance to system administrators. Filter function 110 provides the capability for filtering out user-defined nuisance events such as certain normal occurrence events. In the illustrative embodiment, filter function 110 allows the user to specify that all types of events on a particular node, a particular type of event on a particular node, or a particular type of event on all nodes, are not to be stored. For example, if a device on node n is known to go up and down on a schedule and the user does not want those events stored because they just generate traffic across the network and in the data warehouse 111, the user can define these specific events on that specific node as nuisance events and they will not be stored.

Figure 3:
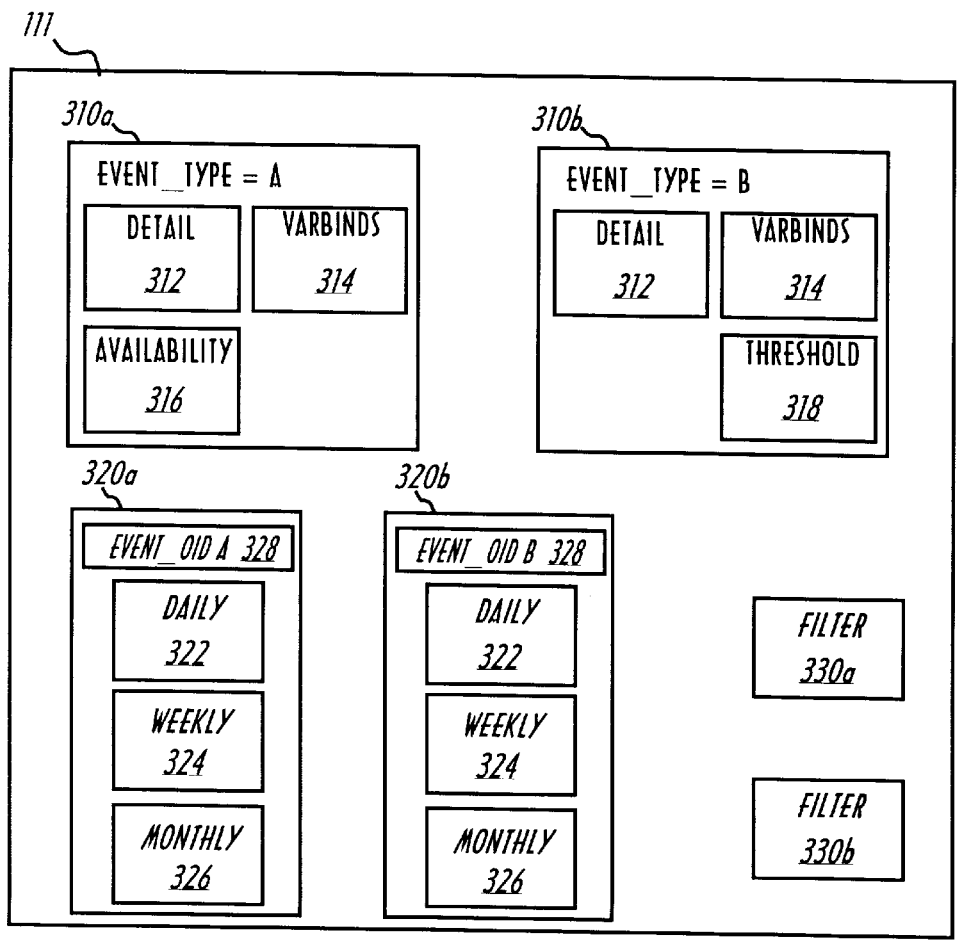
FIG. 3 is a block diagram illustrating example contents of a data warehouse of the invention.

FIG. 3 is a block diagram illustrating one example of how events are stored in data warehouse 111. Although only a few event tables are illustrated in FIG. 3, a populated data warehouse 111 will typically store a multitude of event tables. The tables are stored in objects 310a, 310b, 320a, 320b, 330a, 330b. Respective tables in objects 310a, 310b are linked by a respective common universally unique identifier field event_uuid, discussed hereinafter. Aggregation tables in Objects 320a and 320b are linked by a common unique object identifier, field event_oid, discussed hereinafter. The combination of tables defined for a given event type depends on the anticipated type of reporting that will be performed on the event type. Accordingly, by way of example, event type A may lend itself to availability reporting but never to threshold violation reporting, and accordingly is defined to include an availability table 316. In contrast, event type B may lend itself to threshold violation reporting but never to availability reporting, and accordingly is defined with threshold violation table 318.

In the preferred embodiment, the storage of each event type is defined by one or more table classes, including: event_detail_table 312, event_varbinds_table 314, event_availability_table 316, event_threshold_table 318, event_daily_table 322, event_weekly_table 324, event_monthly_table 326, and event_filter_table 330. There may be additional tables defined to support access to the tables already defined. The class definitions for each of these tables is included hereinafter in Appendix B.

Detail table event_detail_table 312 includes event fields that are common to all event types. In the preferred embodiment, detail table includes all common event fields. This ensures maximum memory efficiency of the detail table because it mandates that every field in the table is full. In the illustrative embodiment, event_detail_table 312 includes fields event_uuid, event_timestamp, category, nodename, application_id, message, severity, event_oid, ov_objectid, protocol, event_type, ip_address, trapsource, trap_name, pid, forward_address, event_source, event_time, and number_varbinds. Field event_uuid is used to associate data in the detail table with data in other related tables. Field event_timestamp records the seconds since epoch for the occurrence of the event and is used because date representations in varying data warehouses are not necessarily consistent. Accordingly, by using a standard form of "epochs since a given date" ensures that the timestamp is consistent across all DBMSs. Field category stores the event type of the associated event, field nodename identifies the name of the node on which the event occurred. Field application_id identifies the software application that generated the event. Field message comprises ASCII text information about the event. Field severity indicates the level of severity of the event (e.g., none, normal, warning, minor, major, or critical). Field event_oid stores an identifier that is unique to the particular event type of the event. Field number_varbinds indicates how many entries exist in the varbinds table that are associated with this event stored in the event detail table. Event_detail_table 312 includes additional fields for identifying event information, including fields ov_objectid, protocol, event_type, ip_address stores, trapsource, trap_name, pid, forward_address, event_source, event_time.

Specific events may also have additional supporting information about the event. This additional information, which is not common to all event types, is stored in a variable bindings table event_varbinds_table 314. Event_varbinds_table 314 attaches a variable number of additional data fields to the event. In the preferred embodiment, variable binding table event_varbinds_table 314 includes fields event_uuid, varbind_sequence, event_oid, val_len, type, and any number of other fields of various types, including string, integer, flt, unsigned32, and unsigned64. Field event_uuid is the field, also stored in event_detail table 312, that is used to map the additional event fields back to the detail table. Field varbind_sequence identifies the variable binding entry for the particular entry in the event_varbinds_table 314, where the total number of varbind entries in event_varbind table for this event should equal the number stored in field number_varbinds in detail table event_detail_table 312. For example, if field number_varbinds in detail table event_detail_table 312 stores an integer "3", three entries having the same event_uuid exist in the variable bindings table event_varbinds_table 314. For different classes of events, Detail table event_detail_table 312 and variable binding table event_varbinds_table 314 each include, and are linked by, a universally unique identifier (UUID) field event_uuid. Detail table event_detail_table 312 and variable bindings table event_varbinds_table 314 together store all available information for a given event. Event_uuid used to reference the pieces of information associated with the event that are not stored in the detail table but in the variable bindings table. Accordingly, given detail table event_detail_table 312, variable bindings table event_ varbind_table 314, and the UUID field event_uuid, one can access all available information known about the event from the outside world.

Generally not all of the available information for an event is useful for purposes of performing statistical process control, tracking trends, or generating reports. For example, reports typically generated for events are organized according to event type, events severity, etc., in order to present them to the user so that they make sense. An attempt to perform reporting using only the detail table and the variable binding table requires, as discussed previously, a series of separate field queries on the detail and variable binding table to obtain all the essential information necessary to generate the report, which drains performance of the system. Accordingly, report-ready tables availability table 316 and a threshold violations table 318 are provided in the preferred embodiment to allow a report-generating application to obtain all of the information necessary to generate a report in a single query per event.

The availability table event_availability_table 316 contains all of the fields from detail table event_detail_table 312 and variable bindings table event_varbind_table 314 relating to any availability event type. In the preferred embodiment, availability events include: node_added, node_deleted, node_up, and node_down. Availability event node_added indicates that a given node has been discovered by the network management system and the network management system is going to start managing it. Availability event node_deleted indicates that the network management system is no longer going to manage a given node. Availability events node_up and node_down indicate active and inactive state transition for that node.

Availability table event_availability_table 316 is used by a report generating application to generate a report illustrating a profile of the availability of a given node in the network over time.

An availability report and threshold report require additional tables 316 and 318 to store the aggregated or manipulated data to thus produce the report. The information in the availability table event_availability_table 316 and threshold table event_threshold_table 318 is a manipulated version or subset of the information contained in the detail and variable binding tables, and event_availability_table 316 is linked to event_detail_table 312 and event_varbind_table 314 through the field event_uuid. Thus, event_availability_table 316 and threshold table event_threshold_table 318 are extractions of the data present in event_detail_table 312 and event_varbinds_table 314 formatted for ease of extraction for report generating applications. In other words, once data warehouse 111 becomes populated, a given event is stored in the event's event_detail_table 312 and event_varbind_table 314, and certain fields from those tables are duplicated with a different layout in event_availability_table 316 and event_threshold_table 318. The organization of the information contained in event_availability_table 316 and event_threshold_table 318 results in higher performance in terms of data extraction access time and system resource utilization.

Certain network events are generated when a monitored device condition exceeds a prespecified target value. For example, if a computer is running out of disk space, a threshold violation event may be generated when the threshold exceeds 90% capacity. Thresholds are typically defined by the system administrator and are set at levels corresponding to the threshold of a condition the administrator wants to be notified. Threshold violations table event_threshold_table 318 is an extraction of the event fields stored in its associated event_detail_table 312 and event_varbinds_table 314 which lends itself to ease in generating threshold violations reports.

Over time, the number of events generated in a typical network management system may become quite large and require significant processing and memory resources to maintain it. For trend tracking and report generation purposes, where the focus is to track the number of occurrences of certain event types per node, the detailed information associated with each event provides no useful purpose. What is important, however, is maintaining a tally of the number of occurrences of event types per node. Accordingly, in the preferred embodiment, a number of aggregation table classes are defined: event_daily_table, event_weekly_table, and event_monthly_table. A preferred embodiment definition for of these classes is set forth in Appendix B. Thus, for each event type, linked by field event_oid, and each node, a count field event_cnt is maintained using event_daily_table, event_weekly_table, and event_monthly_table, and stored in data warehouse 111 on a daily, weekly, and monthly basis. This allows trend tracking and report generating applications to plot and or identify average number of occurrences and or increasing or decreasing trends of occurrences of a particular event for a particular node over time.

Aggregation tables event_daily_table 322, event_weekly_table 324, and event_monthly_table 326 are defined for each event type, identified and linked by field event_oid 328, when it is desired to track tallies of occurrence of events of the same event type as the event. Each of event_daily_table 322, event_weekly_table 324, and event_monthly_table 326 maintains a field event_cnt, as defined in their respective class definitions shown in Appendix B, which stores the count of the event type. In the preferred embodiment, export manager 102 updates field event_cnt, via standard ODBC interface 103, for event_daily_table 322 for each event type, while aggregation function 104 updates field event_cnt for event_weekly_table 324 and event_monthly_table 326, via standard ODBC interface 105, for each event type.

When export manager 102 receives events 101, it counts and maintains a tally of the number of occurrences of event types per node that it processes. Export manager 102 creates an event_daily_table 322 entry for each event type instance and node and increments a running daily count in field event_cnt for each event instance it processes. An event_daily_table 322 may be maintained for each event type and node for each day, or, alternatively, as in the preferred embodiment, the field event_cnt may be added to the appropriate event_weekly_table 324 and event_monthly_table 326 daily, and then reinitialized to zero each day.

Figure 4:
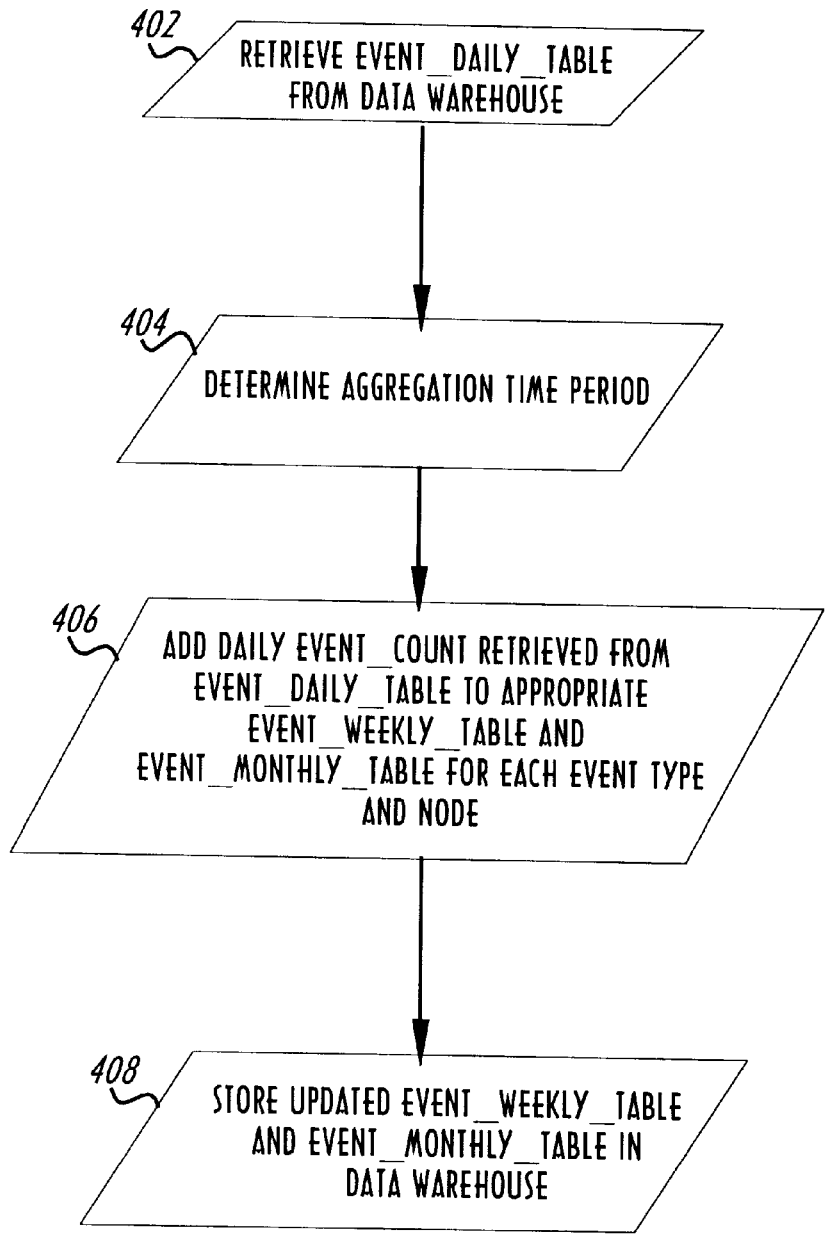
FIG. 4 is a flow diagram in a preferred embodiment of the steps performed by aggregation function.

FIG. 4 is a flow diagram of the steps performed by aggregation function 104 in the preferred embodiment. Aggregation function 104 is scheduled to aggregate the event data stored in data warehouse 111. In a step 402, aggregation function 104 retrieves an event_daily_table from data warehouse 111. As described previously, event_daily_table contains all of the events of a given event type for a given node. Field event_timestamp is referenced in step 404 to coordinate the aggregation of the events. If the event_weekly_table or event_monthly_table for the appropriate time period does not yet exist, aggregate function 104 first creates them before updating their respective event_cnt fields with the appropriate tallies. In a step 408, aggregation function 104 stores the updated event_weekly_table and event_monthly_table in data warehouse 111. As an illustration, if a previous day event count was twenty events for an event type a for node x, when aggregation function 104 is run, it adds the twenty events to the event_cnt field in the event_weekly_table and event_monthly_table associated with the appropriate time period.

The usefulness of aggregation function 104 is that a report can be generated about the aggregate tallies, with a data point for each week and month, and can be plotted over time to identify trends. Furthermore, this trend information is retained regardless of whether the detailed information of each event is retained.

Since, over time, only the historical information of past events is generally of interest, the detail of the events themselves are typically no longer necessary once the aggregation function 104 has counted the event. Accordingly, a trim function 106 is provided to delete unnecessary event information from data warehouse 111 as illustrated in FIG. 1. Trim function 106 purges, via standard interface ODBC 107, event_detail_tables 312, event_varbind_tables 314, event_availability_tables 316, and event_threshold_tables 318 as specified by the system administrator. In the preferred embodiment, the system administrator specifies a timestamp and table type, and trim function 106 deletes all tables of the specified table type that have a timestamp before the specified timestamp. For example, trim function 106 can be used to delete all event_detail_tables 312 and event_varbind_tables 314 that have a timestamp prior to timestamp t. In the preferred embodiment, trim function 106 has the ability to delete any tables before a time measured in a relative seconds, minutes, hours, etc. (e.g., any table associated with an event that happened more than 48 hours ago). Finally, trim function 106 has the ability to delete any table associated with an event that occurred since a given point in time, which is useful in purging data that occurred while the network is down and in debug.

Filter function 110 receives filter specification input 113 in the form of an event type, a Y/N indicator which when set (i.e., "Y") indicates to always filter events of event type and when not set (i.e., "N") indicates to never filter on events of event type, and an integer limit. Filter function 110 creates a filter table event_filter_table 330 for the particular event type. Preferably, event_filter_table 330 allows wildcards. For example, a wildcard is used to filter all event types for the specified node, or filter all nodes for a specific event type. In addition, the integer limit N is set to specify up to the first N events for the specified node for this day to be stored. Event_filter_table 330 is stored in data warehouse 111 via standard interface ODBC 109. Export manager 102 accesses event_filter_table via standard interface 103 and discards all event information that matches the defined filter specifications.

As will be appreciated by those skilled in the art, the invention as herein described provides a method for organizing the raw data from a network management system event stream into special containers to make report relevant data more easily accessible by report generating applications. In addition, the invention provides a mechanism to aggregate the data into a historical format to reveal trends and make easily accessible to generate reports without requiring the detailed event information to be retained.

Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiment shown and described but that the invention be limited only by the claims appended hereto.

What is claimed is:

1. A method for storing network management system events, each of said events comprising one of a plurality of different event types, comprising:

receiving a network management system event, said network management system event comprising a plurality of event fields;

extracting at least a first set of said plurality of event fields from said network management system event;

storing said first set of said event fields in a report-ready table in a relational database, said report-ready table capable of storing multiple events and used by a report generator to generate a report, and said first set of said event fields comprising each of said plurality of event fields that are essential for generation of said report.

2. A method in accordance with claim 1, comprising:

extracting a second set of said plurality of event fields from said network management system event; and storing said second set of said event fields in a detail table, said second set of said event fields comprising at least one of said plurality of event fields that are common to all of said event types.

3. A method in accordance with claim 2, comprising:

extracting a third set of said plurality of event fields from said network management system event;

storing a third set of said event fields in a variable binding table, said third set of said event fields comprising at least one of said plurality of event fields that are not common to all of said event types; and wherein said detail table comprises a link to said variable binding table.

4. A method in accordance with claim 3, wherein:

said second set of said plurality of event fields and said third set of said plurality of event fields together comprise all of said plurality of event fields.

5. A method in accordance with claim 1, comprising:

receiving a report query from said report generator; and sending said first set of said said plurality of event fields to said report generator.

6. A method in accordance with claim 2, comprising:

receiving a detail query from a process; and returning said second set of said plurality of event fields from said detail table to said process.

7. A method in accordance with claim 3, comprising:

receiving a full detail query from a process, said full detail query requiring all available information about said event; and returning said second set of said plurality of event fields from said detail table and said third set of said plurality of event fields from said variable binding table to said process.

8. A method in accordance with claim 7, comprising:

storing at least one additional set of said plurality of event fields in a corresponding at least one additional report-ready tables, said at least one additional report-ready tables used by at least one report generator to generate at least one additional report, and said at least one additional set of said event fields respectively comprising each of said plurality of event fields that are required for generation of said respective at least one additional reports.

9. A method in accordance with claim 3, wherein:
said variable binding table comprises all of said event fields for a given event type that are not included in said detail table.

10. A method in accordance with claim 2, wherein:
said detail table comprises all of said event fields that are common to all of said event types.

11. A method in accordance with claim 1, comprising:
maintaining a count of a number of occurrences of events during a predetermined time interval of said event type of said event;
storing said count in an aggregation table.

12. A method in accordance with claim 1, comprising:
comparing said event to a pre-specified filter condition; and
discarding said event and not storing said event in said data warehouse if said event matches said pre-specified filter condition.

13. A method for retrieving a set of report fields from a network management system event data warehouse, said set of report fields for a given event stored in said data warehouse comprising a first set of a plurality of event fields that together comprise a network management system event, and said set of report fields being stored in a report-ready table that comprises each of said plurality of event fields that are essential for generation of a report, said method comprising:
receiving a network management system event, said network management system event comprising a plurality of event fields;
extracting at least a first set of said plurality of event fields from said network management system event;
storing said first set of said event fields in a report-ready table in a relational database, said report-ready table capable of storing multiple events and used by a report generator to generate a report, and said first set of said event fields comprising each of said plurality of event fields that are essential for generation of said report.

14. A method in accordance with claim 13, comprising:
receiving a report query from said report generator; and
sending said first set of said said plurality of event fields to said report generator.

15. A method in accordance with claim 13, comprising:
maintaining a count of a number of occurrences of events during a predetermnined time interval of said event type of said event;
storing said count in an aggregation table.

16. A data warehouse for storing network management system events, each of said events comprising one of a plurality of different event types, each of said network management system events comprising a plurality of event fields, said data warehouse comprising:
a plurality of related tables each associated with said event, said plurality of related tables comprising a report-ready event table comprising a first set of said plurality of event fields and stored in a relational database, said report-ready table capable of storing multiple events and used by a report generator to generate a report, and said first set of said event fields comprising each of said plurality of event fields that are essential for generation of said report.

17. A data warehouse in accordance with claim 16, comprising:
an export manager configured to receive said event, said export manager comprising formatting means for formatting a first set of said plurality of event fields into a report-ready table, said report-ready table defined according to a reporting type table class, said report-ready table class comprising each of said plurality of event fields that are essential for generation of said report; and
a communications interface for sending said report-ready event table to a data warehouse.

18. A data warehouse in accordance with claim 16, comprising:
an aggregation function which maintains an event count, said event count comprising a total number of occurrences of events of said event type of said event during a specified time interval.

19. A data warehouse in accordance with claim 16, comprising:
a filter function, said filter function creating a filter table specifying a condition;
wherein said export manager reads said condition, and is responsive to said condition to discard said event without storing said event in said data warehouse if said event matches said condition.

20. A data warehouse in accordance with claim 16, comprising:
a data retrieval interface for retrieving said first set of said plurality of events fields from said report-ready table.

* * * * *